United States Patent [19]
Geating

[11] 3,906,120
[45] Sept. 16, 1975

[54] METHOD FOR PREPARING SLIDES FOR BLOOD EVALUATION
[75] Inventor: John A. Geating, Abington, Pa.
[73] Assignee: General Electric Company, Fairfield, Conn.
[22] Filed: May 24, 1973
[21] Appl. No.: 363,745

Related U.S. Application Data
[63] Continuation-in-part of Ser. No. 222,654, Feb. 1, 1972, Pat. No. 3,796,594, which is a continuation-in-part of Ser. No. 85,817, Oct. 3, 1970, abandoned.

[52] U.S. Cl. ............... 427/4; 23/253 TP; 23/230 B; 350/92; 424/3.5
[51] Int. Cl.² ... A01G 5/06; A01N 1/00; A01N 3/00
[58] Field of Search......... 117/3, 124 D; 23/253 TP, 23/230 B; 350/92; 424/5, 3; 427/7, 4

[56] References Cited
UNITED STATES PATENTS
3,553,311  1/1971  Smith...................................... 424/7
3,796,594  3/1974  Thomae et al.......................... 117/3

OTHER PUBLICATIONS
Sabin: Bull, The John Hopkins Hosp., Vol. 34, 1923, pp. 277–288.
Brecher: ATCP Vol. 19, 1949, pp. 895–896

*Primary Examiner*—William R. Trenor
*Attorney, Agent, or Firm*—Allen E. Amgott; Raymond H. Quist; Henry W. Kaufmann

[57] ABSTRACT

Equal parts of methylene azure and methylene blue; methylene blue NN; cresyl violet acetate; and toluidine blue O are each dissolved in alcohol, or in water with a surfactant additive, with use of ultrasonic dispersing means. Any such solution is spread on a microscope slide as a uniform film and allowed to dry. Blood samples applied to the dried slide by spreading drop with a cover glass exhibit differential staining of white cells and reticulocytes, nature of staining varying with stain used.

11 Claims, 1 Drawing Figure

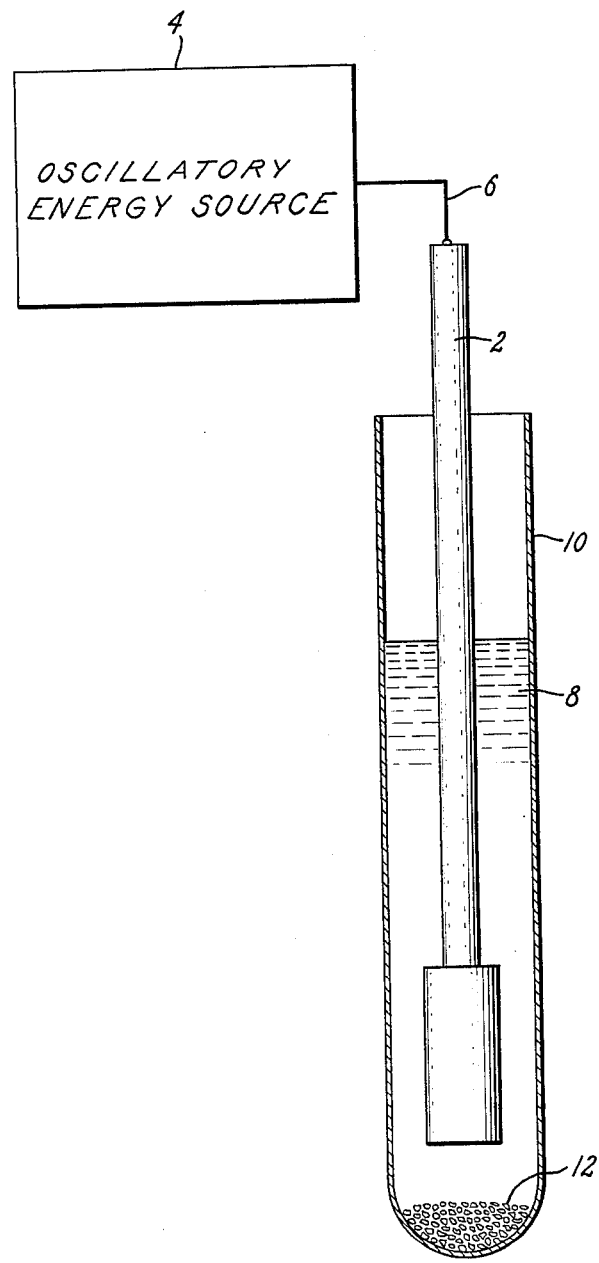

METHOD FOR PREPARING SLIDES FOR BLOOD EVALUATION

CROSS-REFERENCES TO RELATED APPLICATIONS:

This application is a continuation-in-part of my copending joint application PRE-STAINED SLIDES FOR BLOOD TESTS, Frederick W. Thomae, Jr. and John A. Geating, Ser. No. 222,654, filed Feb. 1, 1972, now U.S. Pat. No. 3,796,594 a continuation-in-part of copending Ser. No. 85,817, filed Oct. 3, 1970, and now abandoned, both assigned to the assignee of the present application.

DETECTION OF MALARIAL PARASITES IN BLOOD, Stanley Gottlieb and John A. Geating, Ser. No. 298,549, filed Oct. 18, 1972 now U.S. Pat. 3,834,874, assigned to the assignee of the present application.

BACKGROUND OF THE INVENTION:

1. Field of the Invention

This invention pertains to the production and use of a method for preparing stain-coated slides for differential staining of cells.

2. Description of the Prior Art

It is desirable to identify separately, in a blood sample, the reticula of young viable erythrocytes, platelets, and the various components and constituents of the white blood cell total, such as eosinophils, cytoplasm, cytoplasmic granules, nuclei, and mitochondria. This has, in general, been accomplished by the application of a variety of stains to separate samples for determination of different components of interest. In general, the stains have been applied in solution, although some limited success has been reported using dried film of stain.

Basic vital dyes stain unfixed reticulocytes specifically; when a blood sample is fixed with methyl alcohol, the basic staining is diffuse. Platelet identification and white blood corpuscle differentiation are not achieved.

Sabin has described the use of a dried film of neutral red mixed with Janus green B, upon a slide to which a small amount of blood is added. The neutrophilic, basophilic, and eosinophilic granules are differentiated somewhat by the pH sensitivity of neutral red; mitochondria are counterstained by the Janus green B; and white blood corpuscles are differentiated by staining of cytoplasmic granules, size, and cell mobility — which requires that the cells must be kept alive, despite the moderate toxicity of the stains. Recent tests of this method of which we are cognizant did not produce satisfactory results, possibly reflecting the fact that standards of adequacy have changed since the original Sabin report in 1923.

In other prior art methods, briliant cresyl blue is used to stain reticulocytes; but the white blood corpuscles are not differentiated, and the nuclei stain poorly, and the cytoplasmic staining is irregular.

Reticulocytes may be stained in a mixture of blood and methylene blue NN in saline solution spread and dried on a slide; but platelets are somewhat obscured by precipitate formation, and in the white blood corpuscles only the cytoplasmimc granules are stained.

In my referenced copending joint application Ser. No. 222,654 with Thomae, which is incorporated herein by reference, we teach the preparation of slides for observation of blood components by mixing together alcoholic solutions of methylene blue NN and cresyl violet acetate in suitable proportions and the application of the mixture to a clean microscope slide in a uniform layer. The mixed stain solution is permitted to dry by evaporation of the alcohol, leaving a dry layer of stain on the glass. When a drop of blood is applied to such a slide and spread by application of a cover glass, staining occurs in about five minutes which is described in the referenced application Ser. No. 222,654 as follows:

Neutrophils contain a finely granulated cytoplasm which stains a light purple in the fresh preparation and fades to a greenish tint in the older smear. Nuclei stain a bright purple.

Eosinophils exhibit a bright purple nucleus and a cytoplasm packed with large uniform orange-staining granules which fade to a greenish orange when the preparation is about twelve hours old.

Basophils contain smaller number of uniform-size granules than eosinophils, which stain a dark purple and often completely obscure the nucleus. With focusing, an orange tinge can be observed in the granules found at the edge of the cell, an effective identifying feature.

Lymphocytes develop a purple staining nucleus surrounded by a lighter purple cytoplasm which may become as dark as the nucleus as the preparation grows old.

Monocytes have an affinity for the stain similar to lymphocytes. Distinguishing features are the larger size and the greater amount of cytoplasm of the monocytes. It has been found that the differentiation is readily learned.

Platelets stain a blue color. A platelet estimation is best performed as soon after the staining period as possible because of an accumulation of debris with increasing time.

Reticulocytes contain a reddish-purple network but do not fade even after the red cells become distorted. Nevertheless, the reticulocyte count should also be made within 4 to 5 hours after the staining period because of the fading of some of the red blood corpuscles when they die.

It must be observed that the alcoholic solutions employed in obtaining the results described supra were obtained by normal initial stirring followed by standing from 16 to 24 hours. Any undissolved residue was filtered out. No ultrasonic dispersion was employed, nor was water employed as a solvent or dispersing medium.

References to the prior art are:

Brecher, G. 1949. "New Methylene Blue as a Reticulocyte Stain", *American Journal of Clinical Pathology*, 19:895–6.

Conn, H. J. (ed) *Biological Stains*, Seventh Edith, Williams and Wilkins Company, Baltimore, Md., 1961.

Cunningham, J. H. 1920. "A Method for Permanent Staining of Reticulated Red Blood Cells." *Archives of Internal Medicine*, 26:405–9.

Dacie, J. V. and Lewis, S. M. 1963. *Practical Haematology*, 3rd Edition, Pages 28–29.

Doan, C. A. and Ralph, P. H., Jr., *McClung's Handbook of Microscopial Technique*, 3rd Edition, 1950, pages 571–585.

Frankel, S. and Reitman, S. (eds.) Sonnerwirth, A. C. (asst. ed.) *Gradwohl's Clinical Laboratory Methods and Diagnosis*; Sixth Edition, Volume 2, C. V.

Mosby Company, St. Louis, 1963, Pages 1132–1134.

Spiridonovitch, R. 1924. "Vital Staining of White Blood Cells with Cresylecht Violet." *Anatomical Record*, 27:367–373.

Watson, C. I. and Clark 1937. "Occurrence of Protoporphyrine in Reticulocytes." *Proceedings of the Society of Experimental Biology and Medicine*, 36:65–69.

Hepler, O.E., *Manual of Clinical Laboratory Methods*, Fourth Edition, Charles C. Thomas, Springfield, Ill., 1965, "Hematology."

SUMMARY OF THE INVENTION

Any of four different stains (equal parts by weight of methylene azure and methylene blue; methylene blue NN; cresyl violet acetate; toluidine blue O) is dispersed by the use of an ultrasonic probe either in methanol or in water with a surfactant addition. The filtered solution is applied as a thin layer to a clean glass slide, and dried. A drop of blood sample is applied to the slide thus coated, and spreads beneath a cover glass uniformly over the dried stain. After a few minutes, differential staining of the various blood components occurs. The use of ultrasonic dispersion, and of water with a surfactant addition, is also applicable to the combination of methylene blue NN with cresyl violet acetate, which combination was disclosed in the copending parent application Ser. No. 222,654.

BRIEF DESCRIPTION OF THE DRAWING:

The FIGURE represents an operation in the methods disclosed.

DESCRIPTION OF THE PREFERRED EMBODIMENTS:

Introduction

The following defines those procedures and methods which apply generally to the specific examples given.

Solvent Systems

Methyl Alcohol — Alcohol was used as the solvent system during the preliminary assessment of the dyes for positive staining activity with white blood cells. Dyes were prepared in the saturated state by exceeding the solubility limit of the dye and filtering the resulting suspension through Whatman No. 1 filter paper.

Water — Saturated water solutions were prepared in the same manner; filtration was also accomplished through Whatman No. 1 or No. 2 paper.

Sonic Preparations

Some dye solutions exhibited staining characteristics considered too faint for useful discrimination during microscopic examinations. Solubility could be increased by subjecting the dye/solvent system to the strong mechanical energy generated by the sonic probe. The instrument used was the Sonifier Cell Disruptor, Model No. 185 manufactured by Heat Systems-Ultrasonics, Inc., Planeview, L.I., New York, with a microprobe attachment.

The solution was prepared by adding a known weight of the dye to 5 ml of the solvent; i.e., methyl alcohol or water, in a 22 × 150 mm test tube. The microprobe was inserted into the test tube so as to leave approximately 5 mm clearance at the bottom of the tube. In order to dissipate heat generated, the test tube was encased in a beaker containing ice water. Power was turned on for two minutes at an indicated power output of approximately 60 watts. The resulting solution was filtered through the appropriate Whatman paper.

In the FIGURE, the sonic probe 2 is represented connected to its oscillatory energy source 4 by a cable 6. It is immersed in the solvent 8 in test tube 10, at whose bottom the undissolved dye 12 rests.

Deposition of Dye Film

Use of Surfactants — Aqueous dye solutions were found difficult to apply to the glass slides with uniformity; i.e., the resulting dye film was consistently streaked and irregular. The primary cause was thought to be the relatively high surface tension normally exhibited by water. Therefore, a surfactant, Tween 80 (Polyoxyethylene (80) Sorbitan Monopalmitate, Atlas Chemical Industries, Wilmington, Del.) was added to the dye solution to reduce surface tension. A 1% by weight aqueous solution was prepared and added to each solution on the order of 5 drops (0.20 ml) per 5 ml volume. This treatment allowed uniform dye films to be consistently produced.

Production of Slides — Dye solution to be deposited onto the standard glass microscope slide is placed in either a 1 ml syringe with a 26G needle, or a Pasteur pipette equipped with a rubber bulb. A small drop of the dye solution (experience is needed to determine exact amount) is placed at one end of the glass slide. The edge of another glass slide is drawn through the drop, along the flat surface of the first slide, thus spreading the fluid into a thin film. (The technique is very similar to that employed when spreading a drop of blood along the slide in preparation for a conventional Wright's stain.) With alcohol as the solvent, the dye film will dry in 2–3 seconds; with water, the drying requires 8–10 minutes at ambient temperature or 2–3 minutes at 70°–80°C.

Deposition of Blood For Use

To use the slide for microscopic examination and diagnosis, the following procedure is employed: Place a small drop of blood (3–5 microliter) from either a fresh sample of peripheral blood or preserved in EDTA (ethylenediaminetetraceticacid), etc., in the center of the dye film. Place a 22 × 40 mm cover glass over the drop and allow the resulting surface attraction and capillary action spread the drop over the surface of the slide. The fluid in the blood sample will redissolve the dye film and spread the resulting solution to the blood cells. The slide is ready for microscopic examination after approximately 5 minutes.

EXAMPLE I

AZURE II - AQUEOUS PREPARATION

Preparation of Dye

Materials Needed

Azure II (mixture of equal parts by weight of methylene azure and methylene blue)

Distilled water

Sonic probe

Tween 80 — 1% aqueous solution

Procedure

Prepare 8% solution by adding 400 mg to 5 ml distilled water and treating with the sonic probe for 2 min. as described in Introduction.

Filter through Whatman No. 1 paper.

Make 1:2 dilution by adding equal volumes of water and dye solution.

Add sufficient Tween 80 per Introduction.

Place in syringe or Pasteur pipette and use to spread film on microscope slides according to Introduction.

Range of Activity

Adequate staining results; i.e., staining controls sufficient to make differentiation of white cells, may be achieved with dilutions of this preparation up to and including 1:10.

Staining Characteristics

The dye appears to possess metachromatic properties, although the overall staining color is predominantly blue or blue-purple. Staining is almost exclusively centered in the nuclear material with the notable exception of the eosinophil where the coarse cytoplasmic granules stain a dark, blue-red with a faint blue nucleus; and the basophil where the granules stain a uniform dark red and a pale blue nucleus.

The segmented neutrophils exhibit blue staining of variable intensity in the nucleus; cytoplasmic granules are colorless or a very pale green. There is one exception: some of the segmented neutrophils exhibit large, smooth, dark red staining bodies in the cytoplasm. Their identity has not been definitely established as yet.

Lymphocytes and monocytes stain similarly to the Wright's stain. The nuclei all demonstrate variable shadings of blue but are otherwise not difficult to identify.

Reticulocytes are easily visible with dark blue-purple threads which stand out in the otherwise pale staining erythrocyte. Platelets stain a dark blue and are found both in clumps and singly.

EXAMPLE II

AZURE II - ALCOHOL PREPARATION

Preparation of Dye

Materials Needed

Azure II — as in Example I

Methyl alcohol — reagent grade

Sonic probe

Procedure:

Prepare an 8% solution by adding 400 mg of the dye to 5 ml of methyl alcohol.

Treat with the sonic probe for 2 min. while cooling test tube with ice water bath.

Filter through Whatman No. 1 or No. 2 paper.

Place in syringe or pipette and dispense to glass slides for production of dye film.

Range of Activity

Adequate staining results can be obtained with dilutions of this preparation up to and including 1:2.

Staining Characteristics

Microscopic appearances differ from the water soluble solution in two characteristics: red staining bodies present in the segmented neutrophils are not seen in this preparation, and granules in the cytoplasm of segmented neutrophils stain noticeably darker; e.g., blue-grey for the alcoholic mixture vs. a translucent refractive blue. Nuclei in the lymphocytes stain dark blue to very pale blue; the reason for this variation is not clear at this time. Basophils again exhibit a very difinite dark-red, cytoplasmic staining which almost obscures the nucleus. Eosinophils have deep, red-blue to dark irregular turquoise granules. Platelets stain dark blue, and reticulocytes show dark, purple staining threads and irregularlyshaped bodies.

EXAMPLE III

METHYLENE BLUE NN - AQUEOUS PREPARATION

Preparation of Dye

Materials Needed

Methylene blue NN Color Index No. 52030

Distilled water

Sonic probe

Tween 80 — 1% aqueous solution

Procedure

Prepare 8% solution of the methylene blue NN by adding 400 mg of the dye to 5 ml of water.

Treat with sonic probe for 2 minutes, as described in Introduction.

Filter through Whatman No. 1 or 2 paper.

Make a 1:5 dilution by adding 1 part dye solution and 4 parts water.

Add 5 drops (0.2 ml) of Tween 80 solution.

Place in syringe or pipette and dispense to slides for production of dye film.

Range of Activity

Adequate staining results can be obtained with dilutions of this preparation between 1:2 and 1:25 inclusive.

Staining Characteristics

Overall staining characteristics with this preparation can be described as monochromatic blue of varying intensities. Contrast between nuclear and cytoplasmic areas is good, although differentiation tends to center about morphological criteria. Eosinophils, however, are difficult to identify because obvious contrasts are not immediately apparent between the acidic cytoplasmic granules on one hand and the normally dark, turquoise staining granules of the neutrophils. Modest amounts of experience with the stain provide the necessary criteria.

Basophils exhibit dark blue, uniform staining granules which frequently obscure the nucleus. Reticulocytes demonstrate the usual dark blue threads and/or bodies which are in good contrast to the remainder of the erythrocyte. Platelets stain a blue color and are quite obvious. Lymphocytes and monocytes are easily distinguishable and display excellent contrasts between nucleus and cytoplasm.

EXAMPLE IV

METHYLENE BLUE NN — ALCOHOL PREPARATION

Preparation of Dye

Materials Needed

Methylene blue NN

Methyl alcohol — reagent grade

Sonic probe

Procedure

Prepare an 8% solution of the methylene blue NN by adding 400 mg to 5 ml alcohol.

Treat with sonic probe for 2 minutes using ice bath to cool preparation during operation of sonic apparatus.

Filter through Whatman No. 1 or No. 2 paper.

Prepare a 1:5 dilution by mixing 1 part dye solution with 4 parts alcohol.

Place solution in syringe or pipette and dispense to glass slides to produce dye film.

Range of Activity

Adequate staining may be obtained between the dilutions of 1:2 and 1:10 inclusive.

Staining Characteristics

Staining characteristics are essentially identical to those obtained with the water preparation. Differences, if they exist, are reflected in subtle shifts of shading and color intensities and are therefore subjective in nature.

EXAMPLE V

CRESYL VIOLET ACETATE - AQUEOUS PREPARATION

Preparation of Dye
Materials Needed
  Cresyl violet acetate
  Distilled water
  Sonic probe
  Tween 80 — 1% aqueous solution
Procedure:
  Make a 8% solution by adding 400 mg. of cresyl violet acetate to 5 ml water.
  Treat for 2 minutes with sonic probe.
  Filter through Whatman No. 1 or No. 2 paper and collect filtrate.
  Prepare a 1:10 dilution of the filtrate by mixing 1 part of the dye in 9 parts of water.
  Place in syringe or pipette and dispense to glass slide for production of dye film.
Range of Activity
  Acceptable results can be obtained with this preparation using dilutions between 1:5 and 1:25 inclusive.
Staining Characteristics
  The water preparation of cresyl violet acetate exhibits a generally blue staining effect in the nucleus, very similar to that seen with methylene blue NN and azure II. The cytoplasm of the segmented neutrophils stains pale yellow while the cytoplasmic granules of the eosinophils are bright yellow-green with a rather pale blue nucleus. Granules in the smaller basophil are deep red.
  Reticulocytes are not stained with this dye preparation. Platelets stain a pale turquoise. Lymphocytes and monocytes are seen very similar to the color obtained with the dyes mentioned above; monocytes usually exhibit a blue-stained nucleus of variable intensities.

EXAMPLE VI

CRESYL VIOLET ACETATE - ALCOHOL PREPARATION

Preparation of Dye:
Materials Needed:
  Cresyl violet acetate
  Methyl alcohol - reagent grade
  Sonic probe
Procedure
  Prepare a 8% solution by adding 400 mg of cresyl violet acetate to 5 ml alcohol.
  Treat for 2 minutes with the sonic probe.
  Filter through Whatman No. 1 or No. 2 paper and collect filtrate.
  Prepare a 1:5 dilution by mixing 1 part dye solution and 4 parts alcohol.
  Place resulting solution in the syringe or pipette and dispense to glass slides for production of dye film.
Range of Activity
  Adequate staining may be obtained with dilutions of this preparation between undiluted and 1:25 inclusive.
Staining Characteristics The overall microscopic appearance of blood cells stained with cresyl violet acetate and alcohol, compared to that obtained when combined with methylene blue NN or the water preparation of cresyl violet acetate alone, demonstrate a decidely redder hue. The segmented neutrophils have sharply defined red-blue nuclei and a pale yellow cytoplasm. The eosinophils will exhibit a bright yellow cytoplasm; basophils will have a uniform-sized, granular cytoplasm which stains dark red. The lymphocytes and monocytes appear as expected, but also with the red-blue staining characteristics. Platelets are a pale turquoise. Reticulocytes are not stained.

EXAMPLE VII

TOLUIDINE BLUE O - AQUEOUS PREPARATION

Preparation of Dye:
Materials Needed:
  Toluidine blue O - Color Index No. 52040 (Basic Blue 17)
  Distilled water
  Sonic probe
  Tween 80 — 1% aqueous solution
Procedure
  Prepare a 2% solution by adding 100 mg of toluidine blue to 5 ml of water.
  Treat for 2 minutes with the sonic probe.
  Filter through Whatman No. 1 or No. 2 paper and collect the filtrate.
  Prepare a 1:2 dilution by mixing 1 part of the dye solution and 1 part water.
  Add 10 drops of the 1% Tween 80 solution.
  Place mixture in syringe or pipette and dispense to glass slides for production of dye film.
Range of Activity
  Adequate staining may be obtained with dilutions of this preparation between undiluted and 1:20 inclusive.
Staining Characteristics
  Toluidine blue O presents an overall blue color which is similar to methylene blue NN and azure II, but also exhibits some subtle differences, particularly in the segmented neutrophils and the lymphocytes. In addition, the staining time is markedly increased to a minimum of 10 minutes and continuing beyond 25 minutes. However, differential discrimination can be made after 10 minutes.
  In what would appear to be the younger segmented neutrophils, the nuclei stain a dark blue of variable intensity, with one to four large, clear, unstained vacuole-like areas in the cytoplasm in each of these cells. The remainder of the cytoplasm contains unstained refractile particles; also, large, irregularly-shaped bodies which stain a dark red-blue may be present. The apparently older segmented neutrophils contain large, bloated nuclei which stain a uniform pale blue, and cytoplasm which contains many of the large, irregular, dark red-blue bodies. The clear vacuole-like areas are not seen in these cells.
  Monocytes exhibit pale blue nuclei with only slightly darker clear-blue cytoplasm. Lymphocytes, on the other hand, show distinct differences in the nuclear stain uptake: Some demonstrate dark blue staining nuclei with clear, light blue cytoplasmic areas; others show distinctly light blue staining nuclei with a dark blue, contrasting, uniform cytoplasm. Occasionally, pale turquoise particles are seen in the cytoplasm of either lymphocyte.

Reticulocytes are easily identified with dark blue threads or bodies visible within the erythrocyte. Platelets demonstrate a blue to dark blue staining.

Eosinophils contain large granules which, upon focusing, appear either a dark blue or dark turquoise; the nuclei stain a very pale, uniform blue. The smaller basophils contain very dark purple staining granules which often obscure the nucleus.

EXAMPLE VIII

METHYLENE BLUE NN AND CRESYL VIOLET ACETATE AQUEOUS PREPARATION

Preparation of Dye
Materials Needed

Methylene blue NN (Color Index No. 52030)
Cresyl violet acetate or cresyl echt violet
Polyoxyethylene (80) sorbitan monopalmitate (Tween 80 product of Atlas Chemical Industries, Wilmington, De.) 1% aqueous solution
Distilled water
Sonic probe
Standard pre-washed microscope slides (25 × 75 mm)
Test tubes — 22 × 150 mm
Syringe with 26G needle, or Pasteou pipette and rubber bulb Procedure:

Prepare a 6.4% solution of methylene blue NN by dissolving 320 mg of the dye in 5 ml of distilled water in the 22× 150 mm test tube. Place in an appropriate holder and insert the tip of the sonic probe so that it just clears the bottom of the tube. Turn on the power and allow the sonic energy to solubilize the dye-water mixture for 2 minutes at an indicated power output of approximately 60 watts. Filter through Whatman No. 1 or No. 2 white paper.

Prepare a 8% solution of cresyl violet acetate by dissolving 400 mg of the dye in 5 ml of distilled water in the 22 × 150 mm tube. Treat as above with the sonic probe and filter.

Measure 0.5 ml of the filtered methylene blue NN solution in a test tube and add 4 drops (0.16 ml) of the cresyl violet acetate solution and 5 drops (0.20 ml) of the 1% Tween 80 solution. This is a working solution and is sufficient to prepare approximately 325 slides.

Place the working solution into the syringe or Pasteur pipette and dispense single, small drops onto one end of a glass slide. With another glass slide held on edge, draw this slide through the drop along the flat surface of the other slide, thus spreading the dye solution.

Allow the slide to dry. Process requires 8 to 10 minutes at ambient temperature and humidity. Warm air oven (70°–80°C) will speed up the drying to 2–3 minutes.

Staining Characteristics

The staining characteristics obtained by this process are similar to those disclosed in the copending parent application, described in the discussion of the prior art.

The use of water in place of the more expensive and inflammable alcohol is clearly economically beneficial and may be preferable for this reason in large quantity production. For production of a few slides by hand processes, on the scale given in the examples, alcohol may be preferable because of its more rapid evaporation. The use of sonic dispersion is beneficial, in any case, both because it avoids the long waiting time employed to assure approximate saturation in the process disclosed in the parent case, and because, as has been indicated supra, it affords useful staining preparations with dyes which, when dissolved more conventionally, give only faint staining. No specific reason for this latter effect is known; but since the dyes employed, although standard commercial products, are defined in terms of their colorant properties and are probably mixtures of at least several compounds whose distribution throughout a single dye particle may vary from its surface to its center, it is not surprising that the vigorous agitation produced by the sonic vibrations produces a solution of different properties, superior for the present purpose. While in the hand operations described in the various examples the use of an immersible vibratory probe is convenient, it is clear that in larger scale operations the sonic energy might be applied by vibrating the entire container or, in a continuous process, by flowing the liquid with the solid dye over a vibratory surface too large to merit description as a probe. Possibly a similar result could be achieved less conveniently and less rapidly by ball milling the dye in the solvent. It is also to be noted that the use of the terms "solvent" and "solution" has been that of common parlance, and is not intended to exclude the possibility that the dyes may be at least partially in filterable suspension rather than true solution in the physical chemist's sense.

What is claimed is:

1. The method of providing a glass microscopic slide with a coating of dried stain suitable for differentially staining components of blood applied thereto as a liquid film, which comprises:
   a. immersing in water an excess of a dye selected from the group consisting of (1) methylene azure and methylene blue NN, (2) methylene blue NN, (3) cresyl violet acetate or (4) toluidine blue O;
   b. dissolving the dye in the water by applying sonic energy mechanically thereto;
   c. removing residual solids from the resulting solution;
   d. adding to the solution a quantity of surfactant to reduce the surface tension of the solution;
   e. applying the solution containing surfactant to the surface of a glass microscopic slide to form a thin film of solution thereon;
   f. allowing the thin film of solution to dry.

2. The method claimed in claim 1 in which the selected dye consists essentially of equal parts by weight of methylene azure and methylene blue NN.

3. The method claimed in claim 1 in which the selected dye consists essentially of methylene blue NN.

4. The method claimed in claim 1 in which the selected dye consists essentially of cresyl violet acetate.

5. The method claimed in claim 1 in which the selected dye consists essentially of toluidine blue O.

6. The method of providing a glass microscopic slide with a coating of dried stain suitable for differentially staining components of blood applied thereto as a liquid film, which comprises:
   a. immersing in alcohol an excess of a dye selected from the group consisting of (1) methylene azure and methylene blue NN, (2) methylene blue NN or (3) cresyl violet acetate;
   b. dissolving the dye in the alcohol by applying sonic energy mechanically thereto;
   c. removing residual solids from the resulting solution;

d. applying the solution to the surface of a glass microscopic slide to form a thin film of solution thereon;

e. allowing the thin film of solution to dry.

7. The method claimed in claim 6 in which the selected dye consists essentially of equal parts by weight of methylene azure and methylene blue NN.

8. The method claimed in claim 6 in which the selected dye consists essentially of methylene blue NN.

9. The method claimed in claim 6 in which the selected dye consists essentially of cresyl violet acetate.

10. The method of providing a glass microscopic slide with a dry coating of admixed methylene blue NN and cresyl violet acetate which comprises:

a. immersing methylene blue NN in water and dissolving it in the water by applying sonic energy mechanically thereto to form a first solution;

b. removing residual solids from the first solution;

c. immersing cresyl violet acetate in water and dissolving it in the water by applying sonic energy mechanically thereto to form a second solution;

d. removing residual solids from the second solution;

e. mixing the first solution with the second solution and with a surfactant;

f. applying the mixed first and second solutions containing a surfactant to the surface of a glass microscopic slide to form a thin film of the mixed solutions thereon;

g. allowing the thin film of solution to dry.

11. A glass microscopic slide having one side covered with a dry film of a dye selected from the group consisting of (1) methylene azure and methylene blue NN, (2) methylene blue NN, (3) cresyl violet acetate or (4) toluidine blue O.

* * * * *